Oct. 13, 1936. C. G. VOKES 2,057,219
FILTER
Filed Sept. 5, 1934
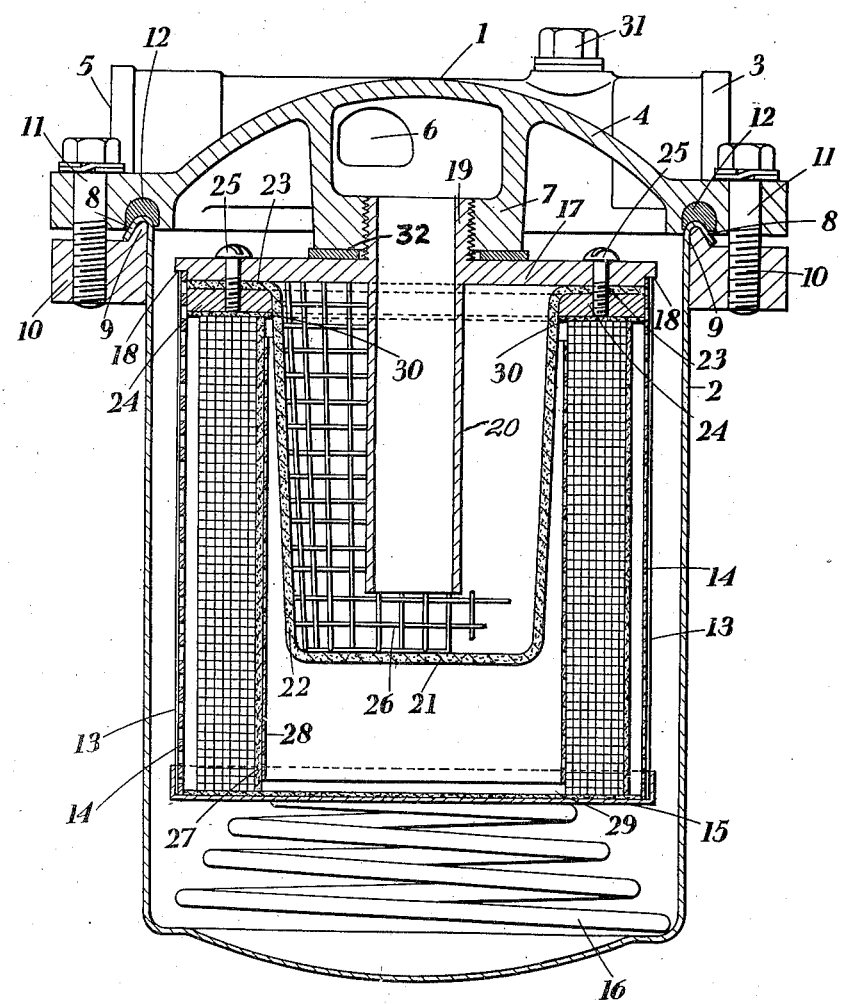
INVENTOR
Cecil G. Vokes
BY
ATTORNEY Patented Oct. 13, 1936

2,057,219

UNITED STATES PATENT OFFICE 2,057,219

FILTER

Cecil Gordon Vokes, Putney, London, England

Application September 5, 1934, Serial No. 742,828
In Great Britain September 7, 1933

1 Claim. (Cl. 210—165)

This invention relates to filters and filter elements and units for use therein. Although the invention is particularly suitable for application to filters used for filtering fuel oil, and specific examples of such filters are given hereinafter, the invention is by no means limited to such application and is applicable to the filtering of fluids of any kind.

It is an object of the invention to provide a filter element which is formed integrally from felted material. Such an element avoids the disadvantage of a joint or joints in the material of which the element is composed.

A difficulty frequently encountered in the filtering art is in the formation of tight seals between the elements and fixed parts of the units or filters to prevent leakage past the elements. A further object of the invention, therefore, is to provide a filter element substantially in the form of a hat, that is, with crown and brim portions the latter portion being easily clamped into close engagement with a fixed part of a filter unit or of a filter. An example of such an element is one formed integrally from felted material and having a cylindrical crown portion which is closed at one end and at the other end is open and provided with an external flange or brim. The word "cylindrical" when used in this specification and the claims which follow is not intended to refer only to bodies of circular cross section but to include bodies having other cross sections such, for example, as oval or star-shaped.

The integral formation of the filter elements from felted material may take place in any suitable manner. For example they may be formed by centrifugal action in the manner in which cylinders of material are formed in the early stages of the production of hatter's felt, or may be formed by a moulding operation, similar to the blocking of a hat, from sheets of felt cut from such cylinders.

In some kinds of filtering work, elements formed integrally from felted material may quickly become choked if used as a first stage element, and it is a further object of the invention to provide a filter or a filter unit wherein such an element is provided in series with one or more other elements. In a convenient form of filter in accordance with the invention, fluid to be filtered is caused to pass through an element of wire gauze and felt before passing to an integrally formed felt element.

Various other objects and advantages will be apparent from the following descriptions of embodiments of the invention, and the novel features will be particularly pointed out in connection with the appended claim.

In the accompanying drawing:

The figure shows in sectional elevation a filter intended for use with fuel oil.

The filter shown in the figure, comprises a header 1, carrying the filter unit proper which is enclosed in a cup 2 secured to the header. The header is provided with an inlet connection 3 communicating with the interior of a domed portion 4 and an outlet connection 5 communicating by a bore 6 with the interior of a bored integral portion 7 of the header which projects downwardly concentrically within the domed portion.

The cup 2 is provided with a downturned edge 8 which is engaged by an upstanding portion 9 of a ring 10; this ring is secured to the header by bolts 11, forcing the edge of the cup into close contact with a ring of packing material situated within a groove 12 which is formed in the under surface of the header concentrically with the domed portion thereof.

The filter unit proper comprises three filtering elements arranged in series so that the oil to be filtered has to pass through each of them in turn. The first of these filtering elements is formed by a layer 13 of copper gauze mounted upon a cylinder 14 of perforated copper plated steel; this element is held in position by a disc 15 with upturned edge embracing the lower edge of the element and pressed upwards by a spring 16 so that the upper edge of the element is pressed against the rim 18 of a circular plate 17, the spring being confined between the disc 15 and the bottom of the cup. The plate 17 has a central hollow upstanding portion 19 by which it is screwed into the portion 7 of the header, communication between the interior of the filter unit proper and the outlet connection 5 being by way of the bore 6 of the header, the interior of the portion 7, the upstanding portion 19 of the plate 17 and a tube 20 extending downwardly therefrom. A ring 32 of packing material is inserted between the plate 17 and the bottom of the portion 7 of the header. The rim 18 of the plate 17 is formed by cutting away from the lower portion of the plate a portion of diameter substantially equal to the internal diameter of the cylinder 14 so as to provide a nice fit.

The third element in order of filtering, comprises a member 21 formed integrally from hatter's felt and resembling a hat having a crown 22 and brim 23. The member 21 is maintained in position by a ring 24 which clamps it by its rim to the underside of the plate 17 by means of screws 25. As shown, the hat-like member is reinforced internally by a layer 26 of large gauge wire mesh.

The second element in order of filtering comprises a layer 27 of felt and silk filtering material carried by a star-shaped member 28 of wire gauze, the whole maintained in position between the disc 15 and the ring 24 by the pressure of the spring 16; a disc 29 and ring 30 of packing material are placed between the ends of the elements and the disc 16 and ring 24 respectively to minimize leakage.

In the operation of the filter, fuel oil enters by way of the connection 3 to the interior of the cup 2 to surround the first element through which it passes, subsequently passing through the second and third elements to reach the interior of the hat-like member 21. The filtrate passes thence to the outlet connection 5 by way of the tube 19. There may be a certain amount of froth and air contained in the incoming fuel oil, but since the tube 19 draws from the bottom of the filtrate within the third element, no air or froth is passed away with the clean oil. In order to allow the removal of air which may become trapped in the filter, an air vent plug 31 is provided in the header communicating with the interior of the cup 2.

Although slight leakage may occur round the ends of the first and second filter elements, the tight seal provided by the brim of the member 21 prevents any direct leakage between inlet and outlet.

I claim:—

A filter comprising a header member having inlet and outlet orifices and comprising two hollow portions the one within the other and communicating with the outlet and inlet orifices respectively, a plate having a bored boss secured to the inner portion of said header and carrying a tube communicating with said outlet orifice by way of said bored boss and said inner hollow portion, a hat-like element moulded from felted material clamped to said plate by a ring engaging its brim to surround the open end of said tube, a casing enclosing said filtering element secured to said header member so that its interior is in communication with the interior of said outer hollow portion thereof, a star-shaped filter element of felt and wire gauze surrounding the crown portion of said moulded element, a filter element of wire gauze surrounding said star-shaped filter element, a plate member engaging said two latter filter elements at one end and a spring confined between said plate member and the end of said casing to press the other ends of said latter two filter elements into contact with said plate secured to said header member.

CECIL GORDON VOKES.